J. RICHARD.
PHOTOGRAPHIC SHUTTER.
APPLICATION FILED DEC. 22, 1908.

1,032,297.

Patented July 9, 1912.

3 SHEETS—SHEET 1.

WITNESSES
W. M. Avery
J. P. Davis

INVENTOR
Jules Richard
BY
Munn & Co
ATTORNEYS

J. RICHARD.
PHOTOGRAPHIC SHUTTER.
APPLICATION FILED DEC. 22, 1908.

1,032,297.

Patented July 9, 1912.

3 SHEETS—SHEET 2.

WITNESSES
W. M. Avery
J. P. Davis

INVENTOR
Jules Richard
BY
Munn & Co.
ATTORNEYS

J. RICHARD.
PHOTOGRAPHIC SHUTTER.
APPLICATION FILED DEC. 22, 1908.

1,032,297.

Patented July 9, 1912.

3 SHEETS—SHEET 3.

WITNESSES:
W. M. Avery
J. P. Davis

INVENTOR
Jules Richard
BY

ATTORNEYS

UNITED STATES PATENT OFFICE.

JULES RICHARD, OF PARIS, FRANCE.

PHOTOGRAPHIC SHUTTER.

1,032,297.　　　　Specification of Letters Patent.　　Patented July 9, 1912.

Application filed December 22, 1908. Serial No. 468,716.

*To all whom it may concern:*

Be it known that I, JULES RICHARD, of 25 Rue Mélingue, in the city of Paris, Republic of France, engineer, have invented Improvements in Photographic Shutters, of which the following is a full, clear, and exact description.

The invention relates to shutters for photographic apparatus and more particularly for stereoscopic cameras.

The new shutter is characterized essentially by the fact that the movement of the leaves of the shutter, in one direction or in both, is operated by percussion by means of a mechanical device independent of the leaves themselves.

In the improved shutter of this invention, the leaves are not subjected to any strain and may therefore be made exceedingly thin and of very light material, for instance they may be constituted of a thin plate of ebonite. Hence these leaves possess a very low inertia. Moreover, the displacement of these shutter leaves being effected by percussion, the inertia of the operating mechanism cannot cause any delay in this displacement since the operating organ does not act on the leaves until the moment when it has attained its maximum velocity. In these conditions the opening and closing of the leaves can be effected in an entremely short space of time, and in such a manner as to allow, in all cases, the leaves to remain at rest for a time when they are fully open whatever the speed of the instantaneous exposure.

Figure 1:
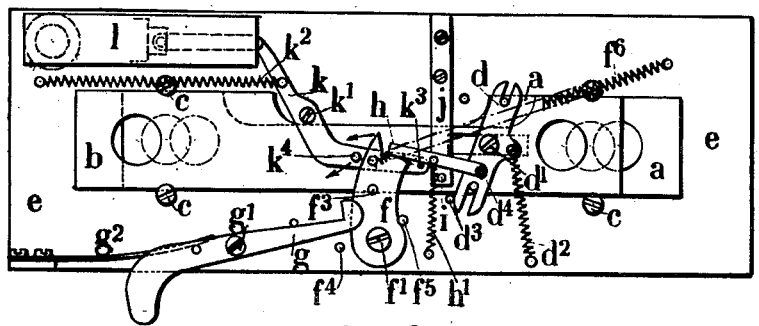
Figure 2:
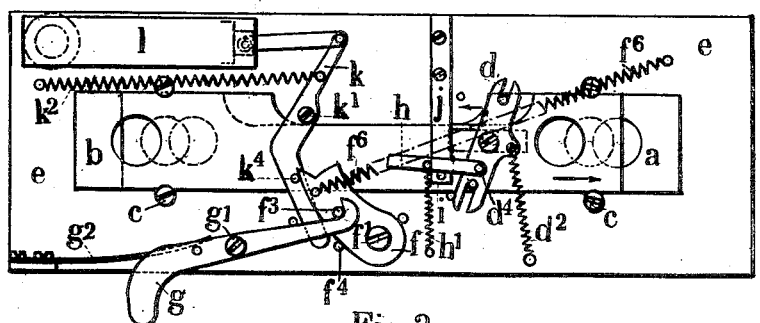
Figure 3:
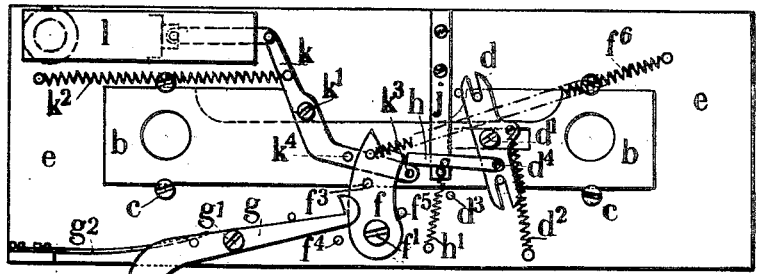
Figure 4:
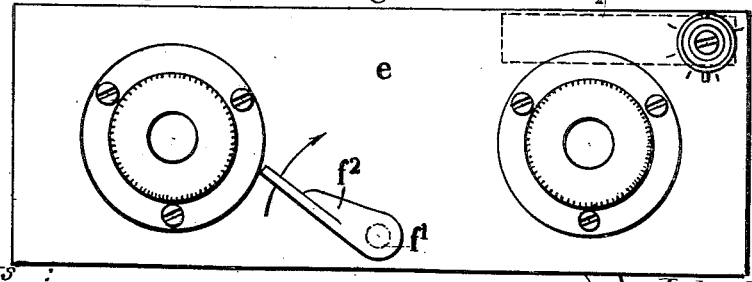
Figure 5:
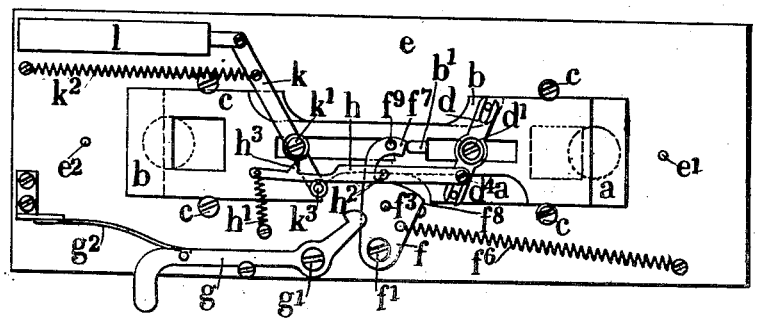
Figure 6:
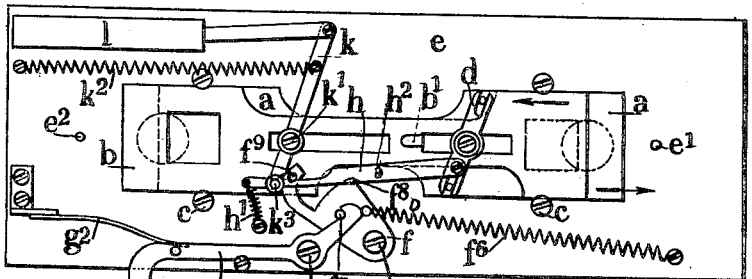
Figure 7:
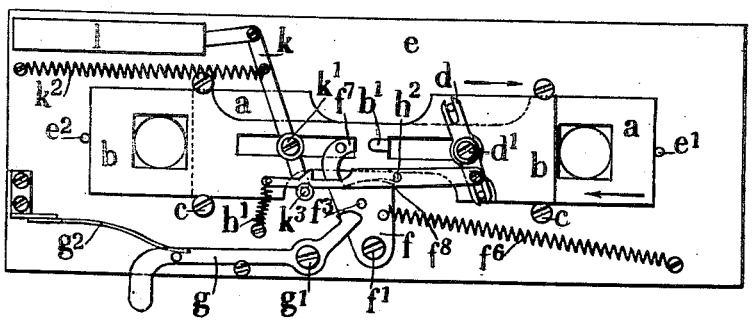
Figure 8:
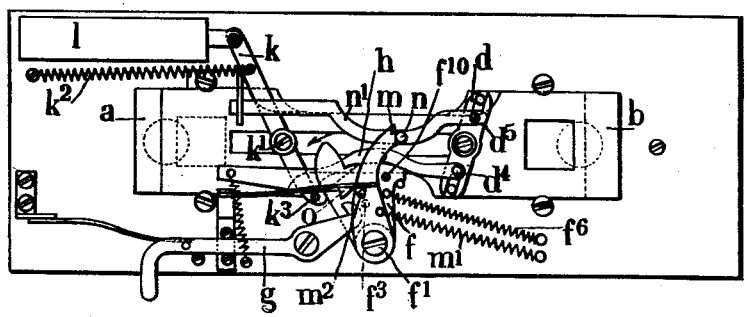
Figure 9:
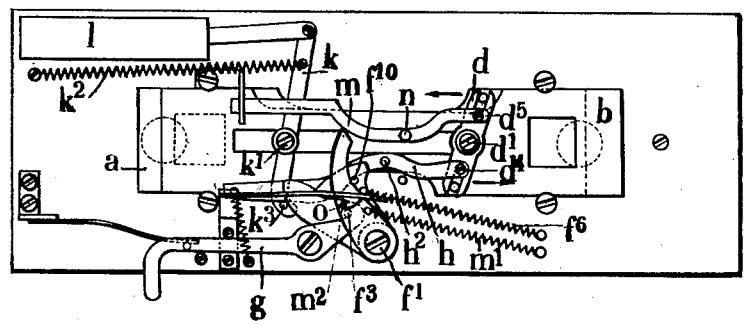
Figure 10:
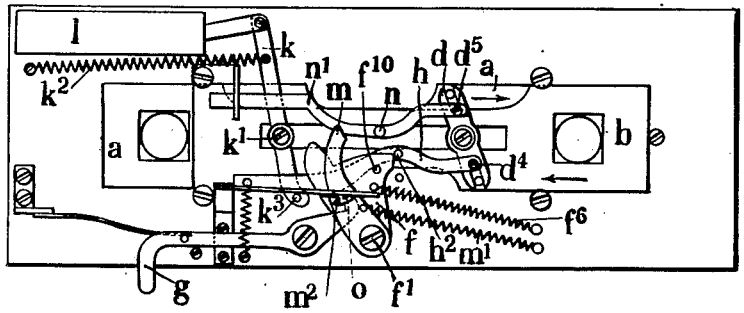
Figure 10:

The invention is illustrated in the accompanying drawing wherein:

Figures 1 to 4 show a shutter in which the opening of the shutter leaves is operated by percussion, while the closing of these leaves is effected by release. Fig. 1 illustrates the mechanism in the position of repose; Fig. 2 in position for work; Fig. 3 shows the shutter open and Fig. 4 is an external view from the operating side. Figs. 5 to 7 show, respectively, in the three positions indicated above, a modification in which the opening and closing of the shutter leaves are both operated by the same percussion organ. Figs. 8 to 10 represent, in the three positions of repose set for work and full opening, another modification in which the opening and closing of the shutter leaves are operated respectively by two separate percussive organs.

The system of shutter represented in Figs. 1 to 4 comprises two shutter leaves $a$, $b$ movable between guides $c$. These two blades move always in opposite directions and are operated by a rocking member $d$ turning above a pivot $d^1$ fixed on the plate $e$ of the apparatus. This rocking member $d$ is acted upon by a coiled spring $d^2$ which exerts a constant tendency to keep the leaves $a$, $b$ in the closed position.

$d^3$ is a stop pin for limiting the travel of the rocking member $d$ when the latter is drawn back by its spring.

The opening of the leaves is effected by a striker $f$ mounted on an axis $f^1$ which turns freely in the plate $e$ and carries externally of the plate an operating lever $f^2$. This striker $f$ carries a pin $f^3$ intended to engage, when the apparatus is set, behind a nose on a releasing lever $g$ pivoted on an axis $g^1$ and acted upon by a spring $g^2$. Stop pins $f^4$, $f^5$ carried by the plate $e$, limit the two extreme positions of the striker $f$. At the moment of release the striker, drawn back suddenly by a spring $f^6$ strikes the end of a rod $h$ pivoted on an axis $d^4$ carried by the rocking member $d$ and acted upon by a coiled spring $h^1$. In the set position the end of this rod is held back by a pin $i$ carried by a piece $j$ which is fixed on the plate $e$ so as to leave a certain free space between itself and this latter, for the passage of the shutter leaves $a$, $b$.

The closing of the shutter is effected by an automatic release mechanism which, at the desired instant, releases the end of the rod $h$ from the striker $f$. This automatic release mechanism comprises a cranked lever $k$ turning on an axis $k^1$ carried by the plate $e$, and subjected to the pull of a coiled spring $k^2$. The end of this lever is connected to the piston of an air brake $l$, while the other end carries a pin $k^3$ for the purpose of lifting the rod $h$ in order to release it from the striker $f$. This lever $k$ carries another pin $k^4$ which is acted on by the back of the striker at the moment the apparatus is set for working.

The *modus operandi* of this system of shutter is as follows: To set the apparatus (which is shown in Fig. 1 in the position of repose) in position for working, the lever $f^2$ is moved in the direction indicated by the arrow in Fig. 4. This causes the striker $f$ to move in the direction indicated by the arrow in Fig. 1. During this movement the back of the striker $f$ comes in contact with the pin $k^4$ and transmits to the lever $k$ a movement of angular displacement in the direction indicated by the arrow in Fig. 1. The pin $k^3$ moves away from the rod $h$ which, under the pull of the spring $h^1$, is brought into contact with the stop pin $i$. At the end of its travel the striker $f$ engages, by means of the pin $f^3$, with the release lever $g$ as shown in Fig. 2, whereupon the apparatus is in position for action. It should be noted that in the present apparatus the shutter leaves $a$, $b$ are not moved during the operation of setting. The apparatus being thus set (Fig. 2) pressure is applied to the release lever $g$ at the moment an instantaneous exposure is to be given. The hook on this lever being released from contact with the pin $f^3$, the striker $f$ is drawn back suddenly into its original position by the pull of the spring $f^6$, and, during its course, strikes against the end of the rod $h$. The latter thus driven back suddenly transmits a sudden movement of angular displacement to the rocking member $d$ which moves the two leaves $a$, $b$ in opposite directions and brings them into the open position shown in Fig. 3. During this movement the automatic release lever $k$ is pulled back by the spring $k^2$ into its original position, at a velocity that is retarded by the air brake $l$. This velocity can be varied at will by opening the air-brake cock to a greater or smaller extent. Shortly before the end of the return stroke of this lever $k$ the pin $k^3$ lifts the rod $h$ and releases it from the striker $f$ whereupon the rocking member $d$ is pulled back by its spring $d^2$ into the position of repose and moves the two leaves $a$ $b$, suddenly, again into the closed position (Fig. 1).

In the present apparatus the opening and closing of the shutter leaves is in all cases effected at a very high speed independently of the time occupied by the instantaneous exposure, and whatever the speed of that exposure, the shutter leaves are in all cases at rest, fully open for a time. Hence the efficiency of this shutter is very great. Moreover, the opening and closing of these shutter leaves is effected the more rapidly in proportion as the inertia of the leaves themselves is reduced, and as the leaves are not subjected to any violent strain (since the impact of the percussion is taken up by the axis $d^1$ of the rocking member $d$) they can be made very thin and of light material as has been mentioned already.

Figs. 5 to 7 show a modification in which the opening and closing of the shutter leaves are both effected by percussion, with one and the same striker. In this modification the striker $f$ is provided with a tail piece $f^7$, for the purpose of effecting the closure of the shutter leaves by acting on a lug or projection $b^1$ of the shutter leaf $b$. The rod $h$, which effects the opening of the shutter leaves, $a$, $b$ carries a pin $h^2$, which is acted upon by the edge $f^8$ of the striker $f$. This rod $h$ is prolonged in such a manner that when the mechanism is set for action, the free end of this rod rests against the lug $k^3$ on the end of the automatic release lever $k$. The rod $h$ is provided with a hook $h^3$ against which rests a pin or screw head $f^9$ carried by the tail piece $f^7$ of the striker $f$, when this latter is set ready for action (Fig. 6). By means of this arrangement the shutter leaves are blocked and cannot accidentally open. This apparatus works in the following manner: The apparatus being set ready for action, as shown in Fig. 6, as soon as the release lever $g$ is operated, the striker $f$ is drawn back by its spring $f^6$ whereupon its edge $f^8$ strikes against the pin $h^2$ of the rod $h$ and causes the shutter blades $a$, $b$ to open as in the previous case. These latter are arrested at the end of their travel to full aperture by the stops $e^1$, $e^2$ on the plate $e$. In this position of full aperture (Fig. 7) the striker $f$, the edge $f^8$, of which is always in contact with the pin $h^2$ of the rod $h$, is arrested until the instant when the pin $k^3$ of the automatic release lever $k$, (which is drawn back by the spring $k^2$ into its original position, as previously, at a speed that is retarded by the air-brake $l$) lifts the rod $h$ and thus releases the pin $h^2$ from the edge $f^8$ of the striker $f$. This latter is thereby set free again and completes its return stroke under the influence of the coiled spring $f^6$. During this second portion of the travel of the striker $f$, the tail piece $f^7$ strikes against the lug $b^1$ and effects the closure of the shutter leaves $a$, $b$.

Figs. 8 to 10 show another modification in which the opening and closing operation of the leaves $a$, $b$ are effected by two distinct strikers. This apparatus comprises a striker $f$ similar to that described in the first case, and acting on the pin $h^2$ of the rod $h$ which effects the opening of the leaves $a$, $b$ and a second striker $m$ mounted loosely on the axis $f^1$ of the first striker and acted upon by a coiled spring $m^1$. This second striker is intended to act upon a pin $n$ carried by a rod $n^1$ articulated at $d^5$, on the rocking member $d$ and effecting the closure of the leaves $a$, $b$. The striker $f$ carries a pin $f^{10}$ which moves the striker $m$ when the apparatus is being set ready for action, and the striker $m$ carries a pin $m^2$ which engages at the end of its travel with a spring catch $o$. This apparatus works in the following manner: The mechanism (being in the position of repose shown in Fig. 8) is set ready for action by moving the operating lever as in the previous case, so as to displace the striker $f$ in the direction indicated by the arrow shown. The second striker $m$ is made to share this movement by means of the pin $f^{10}$ of the striker $f$. The striker $f$ engages, by means of its pin $f^3$, with the hook on the release lever $g$, and the pin $m^2$ of the second striker $m$ engages with the spring catch $o$. To make an instantaneous exposure the release lever $g$, is operated whereupon the hook on this latter disengages itself from the pin $f^3$. The striker $f$ being thus liberated is drawn back by its spring $f^6$ and strikes against the pin $h^2$ of the rod $h$ which, being thus forced back, effects the opening of the leaves $a$, $b$, as in the two previous instances (Fig. 10). During this displacement of the first striker $f$, the second striker $m$ remains engaged with the catch $o$ and is not released until the moment when this catch is lifted by the pin $k^3$ of the automatic release lever $k$ which returns to its original position under the influence of its spring $k^2$, at a speed that is reduced by the air-brake $l$, as already mentioned in the two previous cases. This second striker $m$ on being thus liberated is drawn back in turn by its spring $m^1$ and strikes against the pin $n$ of the rod $n^1$. This latter is thereby driven back in the direction indicated by the arrow shown in Fig. 10 and effects, by this movement, the sudden closure of the leaves $a$, $b$. The present system of operation by percussion can also be applied to simple shutters, that is to say to photographic cameras with only one lens. It will be understood of course that in this case, each of the shutter leaves is provided with only one aperture, and that these leaves may be of any suitable form.

Claims:

1. The combination with a shutter, of a striker for striking the shutter open, said striker being independent of the shutter, and out of contact therewith at the commencement of its stroke, whereby to engage the shutter after the inertia of the striker has been overcome.

2. In a photographic shutter, the combination of two shutter leaves connected by a rocking member adapted to cause them to move in reverse directions, an operating rod hinged to the rocking member and an operating lever, a striker keyed on the axis of the operating lever and adapted to strike upon the operating rod in order to cause the displacement of the leaves, a releasing lever with which the striker meshes when the apparatus is set for working, an automatic releasing lever provided with an air brake, the automatic releasing lever being operated by the striker when the apparatus is set for working, and a spring for returning the automatic releasing lever when the striker is released, said lever setting the return member of the leaves into operation at the end of its end stroke.

3. In a photographic shutter, the combination of two shutter leaves, a rocking member connecting the said leaves and adapted to move in reverse directions to cause them to move in reverse directions, an operating rod hinged to the rocking member, an operating lever a striker keyed on the axis of the operating lever and adapted to strike upon the operating rod in order to cause the opening of the leaves, a releasing lever with which the striker meshes when the apparatus is set for working, a second striker adapted to strike upon the operating rod hinged on the rocking lever in order to determine the closure of the leaves, an automatic releasing lever provided with an air brake, the automatic releasing lever being operated by the first striker when the apparatus is set for working and a spring for returning the automatic releasing lever to a position of rest when the first striker is released, said striker setting the second striker in operation at the end of its return stroke.

4. The combination with the leaf of a shutter, of means acting normally to close the same, means for striking the leaf into open position and holding it in such position against the resistance of the closing means, means for disengaging the leaf from the striking means to permit it to close, means for releasably holding the leaf in set position, means whereby the setting of the leaf will restrain the operation of the striker disengaging means, and whereby the release of the striker will release said means, and means for varying the speed of the operation of the said disengaging means after it is released.

5. In combination with the leaf of a shutter, of means for normally holding the leaf closed, a striker for striking the leaf and holding it open, means for disengaging the striker from the leaf to permit the closing means to close said leaf, a releasable catch for holding the leaf in set position, means whereby the setting of the leaf will restrain the operation of the disengaging means, and whereby the release of the striker will release said means, and means for varying the speed of operation of the disengaging means.

6. In a device of the character specified, the combination with the leaf of a shutter, of means acting normally to close the same, a striker for engaging and opening the leaf, means for operating the striker to open the leaf and hold it open, a releasable catch for holding the striker in set position, and means operated by the release of the striker for disengaging it from the leaf to permit the leaf to close.

7. In a device of the character described, the combination with the leaf of a shutter, of means acting normally to close the leaf, a swinging lever for opening the leaf, a spring connected with the lever for holding the leaf in open position, a releasable catch for holding the lever in set position, means operated by the release of the lever from the catch for disengaging the lever from the leaf to permit said leaf to close, and means for varying the speed of operation of the said disengaging means.

8. The combination with the leaf of a shutter; of means for striking and opening the leaf, and holding it open, means for positively closing the leaf, means for releasably holding the striking means in set position, means operated by the striker when released from the holding means for restraining the operation of the closing means, means for releasing the said closing means from the striker, and means for varying the speed of operation of the said releasing means for the closing means.

9. The combination with the leaf of a shutter, of a swinging striker for striking the shutter open, means for swinging the striker, a releasable catch for holding the striker in set position, means for closing the shutter, means operated by the striker when released for restraining the operation of the closing means, and means for engagement by the striker when in set position to hold the said releasing means in operative position.

10. The combination with the leaf of a shutter, of a swinging striker for striking the leaf open, means for swinging the striker, and a releasable catch for holding the striker in set position.

The foregoing specification of my improvements in photographic shutters signed by me this 5th day of December 1908.

JULES RICHARD.

Witnesses:
HANSON C. COXE,
MAURICE H. PIGUET.